United States Patent [19]
Turner

[11] 3,758,610
[45] Sept. 11, 1973

[54] PREPARATION OF ISOPRENE FROM ISOBUTYLENE AND METHYLAL

[75] Inventor: John O. Turner, West Chester, Pa.

[73] Assignee: Sun Oil Company, Philadelphia, Pa.

[22] Filed: Mar. 22, 1971

[21] Appl. No.: 126,934

[52] U.S. Cl........... 260/681, 260/615 R, 260/632 B
[51] Int. Cl.......................... C07c 1/20, C07c 11/18
[58] Field of Search................. 260/681, 682, 632 B

[56] References Cited
UNITED STATES PATENTS
2,739,995  3/1956  Copenhauer....................... 260/681

OTHER PUBLICATIONS
Dermer et al., J. Amer. Chem. Soc., Vol. 74, (1952), pages 4595–4597.

Primary Examiner—Paul M. Coughlan, Jr.
Attorney—George L. Church, Donald R. Johnson, Wilmer E. McCorquodale, Jr. and Stanford M. Back

[57] ABSTRACT

The reaction of isobutylene and methylal to form a mixture 1,3-dimethoxy-3-methyl butane and 4-methoxy-2-methylbutene-1 and rearrangement of the same to yield isoprene and methanol is disclosed herein. The isobutylene and methylal may be obtained by the oxidation of isobutane to form t-butylhydroperoxide, followed by rearrangement of the hydroperoxide to yield methylal and t-butyl alcohol and dehydration of the alcohol to produce isobutylene.

12 Claims, No Drawings

PREPARATION OF ISOPRENE FROM ISOBUTYLENE AND METHYLAL

CROSS-REFERENCE TO RELATED CASES

Step 2 of the process described below is related to earlier-filed application, Ser. No. 98,036 filed Dec. 14, 1970, in the name of John O. Turner, and which is a continuation-in-part of Ser. No. 873,093 filed Oct. 31, 1970, now abandoned, by the same inventor, and entitled "IMPROVED SYNTHESIS OF ALIPHATIC AND ALICYCLIC ETHERS."

BACKGROUND OF THE INVENTION

This invention relates to a novel method for the preparation of isoprene. More particularly, this invention relates to a process whereby isobutylene and methylal are reacted to form a mixture of 1,3-dimethoxy-3-methylbutane and 4-methoxy-2-methylbutene-1 containing small amounts of isoprene and methyl t-butyl ether, which, when heated with acid rearranges to form isoprene and methanol. The isobutylene and methylal are both desirably derived from a series of steps comprising the oxidation of isobutane to form a mixture of t-butyl-hydroperoxide and t-butyl alcohol, followed by the reaction of the t-butyl-hydroperoxide with methanol under acid conditions to form methylal and additional t-butyl alcohol. The t-butyl alcohol may then be dehydrated to provide isobutylene.

PRIOR ART

Known prior art which appears relevant to each of the steps of the process discussed hereinbelow is as follows:

STEP 1: Discussed in Step 1 of the Description of the Invention below.

STEP 2: U.S. application, Ser. No. 98,036 filed in December, 1970, in the name of John O. Turner and entitled "IMPROVED SYNTHESIS OF ALIPHATIC AND ALICYCLIC ETHERS." In that case, however, as distinguished from the instant one, the acid concentration is substantially higher and as a result methyl t-butyl ether is formed rather than butanol.

STEP 3: Discussed in Step 3 of the Description of the Invention below.

STEP 4: JACS 74, 4595 (1952), which teaches the reaction of isobutene with methylal to form chiefly 1,3-dimethyoxy-3-methyl butane. This article does not, however, teach or suggest the conversion of the methoxy butanes to isoprene.

STEP 5: U.S. Pat. No. 2,739,995, which teaches treating 2-methyl-2,4-dimethoxy butane at temperatures as low as possible, and preferably at 75° to 165°C in the presence of an acid catalyst, to form isoprene. The formation of other conjugated dienes from compounds such as 1,3-dimethoxy-3-methyl butane are likewise suggested by this reference. It has been found, however, that when this latter material is reacted under the temperature conditions taught by the reference, little or no isoprene is formed.

SUMMARY OF THE INVENTION

The above reactions may best be illustrated by the following equations:

1. 2 i-C₄H₁₀ + 1.5 O₂ ⟶ (CH₃)₃COOH + (CH₃)₃COH

Isobutane          T-Butyl              T-Butyl
                      Hydroperoxide        Alcohol 2. (CH₃)₃COOH + 3 CH₃OH ⟶ CH₂(OCH₃)₂ 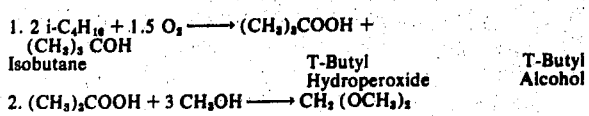

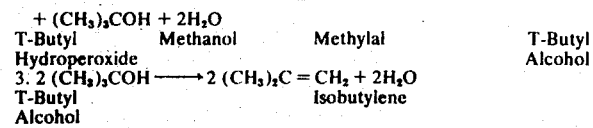

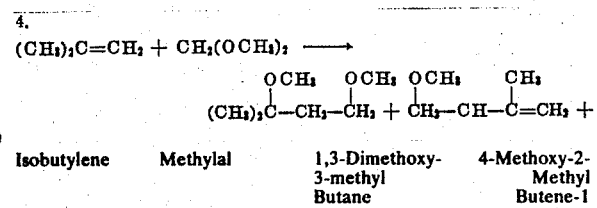

4.
(CH₃)₂C=CH₂ + CH₂(OCH₃)₂ ⟶

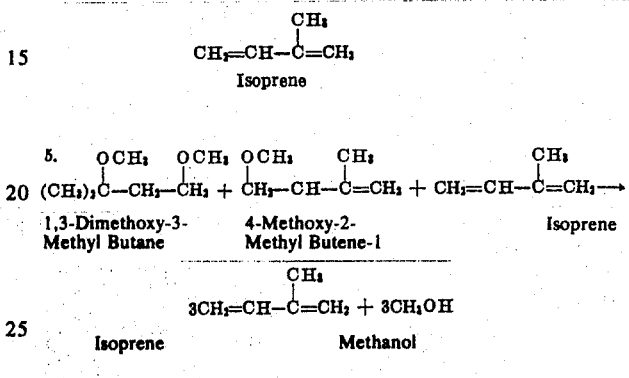

| Isobutylene | Methylal | 1,3-Dimethoxy-3-methyl Butane | 4-Methoxy-2-Methyl Butene-1 |

CH₂=CH—C(CH₃)=CH₂

Isoprene

5.

| 1,3-Dimethoxy-3-Methyl Butane | 4-Methoxy-2-Methyl Butene-1 | | Isoprene |

3CH₂=CH—C(CH₃)=CH₂ + 3CH₃OH

Isoprene                        Methanol

DESCRIPTION OF THE INVENTION

Step 1

The oxidation of isobutane to produce t-butylhydroperoxide and t-butyl alcohol is well known in the art, as described for example in I & EC, Vol. 53, P. 655 (1961). Thus, this reaction may conveniently be carried out by the liquid phase oxidation of two moles of isobutane with one and one-half moles of oxygen at a temperature of about 130° to 140°C and a pressure of 500 to 700 psi to produce a mixture of t-butylhydroperoxide and t-butyl alcohol. This mixture may readily be separated by distillation and each of the products recovered for use in subsequent steps.

Step 2

The t-butylhydroperoxide obtained in Step 1 (or from any other known source) is then converted to methylal and t-butyl alcohol by reacting the hydroperoxide with methanol in the presence of an acid catalyst. Preferably, a selected metal salt co-catalyst is also employed to enhance both the yield and reaction rate.

This process may be carried out by mixing the t-butyl hydroperoxide in the methanolic acid medium for about one-half to five hours at a temperature of from about 20° to 80°C, preferably under autogenous pressure, and then recovering the resulting methylal and t-butyl alcohol mixture, which may be separated by flash distillation.

As stated above, it is preferred that a metal salt catalyst also be employed. These salts are those whose metals are from groups IB, VI, VII or VIII of the Periodic Table, and whose anions, while not critical, are preferably the sulfate, nitrate, oxide, oxalate or chloride. Amongst the metals, cobalt, iron, copper, nickel, manganese and chromiun are preferred.

The acids employed are generally concentrated mineral acids such as hydrochloric, phosphoric, polyphosphoric, sulfuric or perchloric, although sulfuric acids or acid-treated molecular sieves may also be employed.

The preferred acid is sulfuric acid, which may be used in concentrations of from about 90 percent to 20 percent oleum.

In order to assure optimum results, it is important that the ratios of the hydroperoxide, the acid, the alcohol and the metal salt be kept within certain specified ranges. Thus, the alcohol should be present in a two-to-twelve fold molar excess, based on the moles of hydroperoxide, and preferably from about a seven-to-ten fold molar excess of the alcohol.

The amount of acid should, as mentioned above, be based on the amount of alcohol present in order to provide about a 1 to 4 weight percent concentration of the acid based on the total weight of the acid-alcohol mixture. The preferred weight percent of acid is about 2 to 3 percent. Although amounts below 1 percent may be employed, it is essential that the acid concentration not exceed about 4 percent, since at higher concentrations the formation of ether is favored to the exclusion of t-butyl alcohol.

The amount of metal salt catalyst used should be in the range of from about 0.1 to 5.0 grams per 50 to 75 grams of alcohol-acid solution, and preferably from about 1.0 to 3.0 grams.

Step 3

The t-butyl alcohol obtained in Steps 1 and/or 2 may readily be converted to isobutylene by conventional dehydration procedures such as are described in U.S.S.R. No. 127,252 (Mar. 25, 1960); CA 1960, 19680i; or British Patent No. 576,480 (1946).

Thus, for example, by heating t-butyl alcohol in the presence of silico-tungstic acid at a temperature of from 80 to 100°C for at least one hour at atmospheric pressure there is obtained isobutylene in yields in excess of 85 percent.

Step 4

The isobutylene obtained in Step 3 and the methylal obtained in Step 2 are then reacted to form a mixture containing minor amounts of isoprene and methyl t-butyl ether and a major amount of isoprene precursors; namely, a mixture of 1,3-dimethoxy-3-methylbutane and 4-methoxy-2-methybutene-1, together with small amounts of methyl t-butyl ether and isoprene.

This reaction is advantageously carried out by reacting the isobutylene with methylal in the presence of a Lewis acid or solid acid catalyst for from one to seven hours, and preferably three to four hours, at a temperature of from about 20° to 100°C, and preferably at room temperature. It is essential that this reaction be carried out under anhydrous conditions to avoid as much as possible the formation of ethers.

The acid catalysts which may be used include boron trifluoride, boron trifluoride etherate, boron trifuloride in phosphoric acid, boron trifluoride on alumina, stannic chloride, aluminum bromide, sulfuric acid and titanium tetrachloride, of which boron trifluoride catalyst is preferred. The amount of catalyst used should preferably be in the range of from 5 to 25 grams of catalyst per 100 grams of total reactants, but this ratio is not critical.

The ratio of isobutylene to methylal is not critical either and may vary from equimolar amounts to an excess of either reactant.

Neutralization of the product mixture with any suitable alkaline material, followed by separation of the catalyst phase from the product phase yields a product mixture of the aforesaid isoprene precursors comprising principally 1,3-dimethoxy-3-methylbutane admixed with small amounts of 4-methoxy-2-methylbutene-1, methyl t-butyl ether and isoprene. This mixture need not be separated since the total mixture is then treated in the next step as described below.

Step 5

The product mixture obtained from Step 4, and containing a major proportion of 1,3-dimethoxy-3-methylbutane together with minor amounts of 4-methoxy-2-methylbutene-1, methyl t-butyl ether and isoprene, is then pyrolyzed at temperatures of from 175° to 350°C, and preferably at about 200°C, in the presence of an acid catalyst, to form a mixture of isoprene and methanol. The methanol, after separation from the isoprene by distillation, is desirably recycled to Step 2 of this process.

The acid catalysts employed in this step include such materials as ion exchange resins, for example Amberlyst resins (polystyrene-sulfuric acid type resins made by Rohm and Haas, Philadelphia, Pa.); molecular sieve catalysts of the silica/alumina type (such as Linde SK-400 mole sieve made by Linde Division of Union Carbide Corporation, N.Y.); or organic acids such as p-toluene sulfonic acid.

Together with the acid catalyst, there may be employed organic solvents such as dimethylformamide or n-methyl-2-pyrolidone, in amounts of approximately equal weights of solvent and feedstock. When the reaction is carried out without a solvent, there may be employed instead a fixed bed catalyst reactor, over which the feed material may be passed.

EXAMPLE 1

Step 1

Reactions are carried out in a stainless steel reactor with a 1000 psig pressure rating. The charge consists of 400 grams of isobutane with 1 gram of di-t-butyl peroxide as an initiator. The reactor is charged with isobutane and heated to 125°C. Compressed air is then metered into the reactor through a disk filter. After 15 hours at 125°C the reactor is cooled and the product worked up. The conversion is 50 percent and the yields of t-butylhydroperoxide and t-butyl alcohol is 46 and 44 percent, respectively.

EXAMPLE 2

Step 2

Ten grams (0.1 mole) of t-butyl hydroperoxide is added to 20 grams of a 2 percent weight solution of sulfuric acid in methanol containing 0.5 grams of a ferrous sulfate. The reaction is stirred for 4 hours at 60°C under autogenous pressure and then is worked up by a reduced pressure flash distillation. The conversion to methylal and t-butyl alcohol is 50 percent, and the yields are 95 percent and 87 percent, respectively.

EXAMPLE 3

Ten grams (0.1 mole) of t-butyl hydroperoxide are added to 50 grams of a 1 percent weight solution of sulfuric acid in methanol containing 1.0 grams of ferrous sulfate and the reaction run in the same manner as Example 2. The conversion of methanol to methylal and t-butyl alcohol is 85 percent, and the yields are 90 percent and 85 percent, respectively.

EXAMPLE 4

Ten grams (0.1 mole) of t-butyl hydroperoxide are added to 30 grams of a 2 percent weight solution of phosphoric acid in methanol containing 1.0 grams of copper oxide. The reaction is stirred for 4 hours at 60°C under autogenous pressure. The conversion to methylal and t-butyl alcohol is 60 percent and the yield is 85 percent.

EXAMPLE 5

Step 3

One mole of t-butyl alcohol is passed through a continuous flow reactor containing silicotungstic acid at 100°C and 1 atmospheric pressure to yield 50 grams (.89 mole) of isobutene.

EXAMPLE 6

One mole of t-butyl alcohol is heated with 10 grams of 5 weight percent $H_2SO_4$ at 200°C at a pressure of 50 atmospheres to yield 0.80 moles of isobutene.

EXAMPLE 7

Step 4

Thirty-eight grams (0.5 mole) of methylal and 4 grams of $BF_3$ etherate are added to a reaction pressure vessel. To this is added 0.25 moles of isobutylene (14 grams) under pressure. After stirring for 3 hours at 25°C, the mixture is neutralized with sodium carbonate and the products isolated by phase separation. The reaction produces 1,3-dimethoxy-3-methyl butane, 4-methoxy-2-methylbutene-1, isoprene and methyl t-butyl ether in yields of 55 percent, 15 percent, 7 percent and 14 percent respectively.

EXAMPLE 8

In accordance with the procedures of Example 7, but using 3 grams of $BF_3$, and carrying out the reaction for one hour, there is obtained a mixture of 1,3-dimethoxy-3-methyl butane, 4-methoxy-2-methyl butene-1, isoprene and methyl t-butyl ether in amounts of 65, 15, 3 and 9 percent, respectively.

EXAMPLE 9

In accordance with the procedures of Example 7, but using 2.0 grams of $BF_3$ with 0.25 moles of methylal and 0.25 moles of isobutylene, there is obtained a mixture of 1,3-dimethoxy-3-methyl butane, 4-methoxy-2-methyl butene-1, isoprene and methyl t-butyl ether in amounts of 54, 17, 2 and 20 percent, respectively.

EXAMPLE 10

In accordance with the procedures of Example 7, but using 0.5 moles of isobutylene with 0.25 moles of methylal, there is obtained a mixture of 1,3-dimethoxy-3-methyl butane, 4-methoxy-2-methyl butene-1, isoprene and methyl t-butyl ether in amounts of 50, 18, 7 and 15 percent, respectively.

EXAMPLE 11

In accordance with the procedures of Example 7, but using 6 grams of $BF_3/H_3PO_4$ in place of $BF_3$ etherate, there is obtained a mixture of 1,3-dimethoxy-3-methyl butane, 4-methoxy-2-methyl butene-1, isoprene and methyl t-butyl ether in amounts of 35, 17, 1 and 40 percent, respectively.

EXAMPLE 12

Step 5

A mixture containing ten grams (0.075 mole) of 1,3-dimethoxy-3-methyl butane, 3.0 grams (0.02 mole) of 4-methoxy-2-methyl butene-1 and 0.34 gram (.005 mole) of isoprene (a combined total of 0.1 moles of charge) is passed through a reactor containing 6.0 grams of Linde SK-400 molecular sieve at 250°C over a 3 hour interval. The yield of isoprene is 90 percent and the conversion is 95 percent. After six repetitions of this experiment, there is still no observable catalyst deterioration and the yields are still in the 90 percent range.

EXAMPLE 13

In accordance with the procedures of Example 12, but employing 13.2 grams (0.1 mole) of 1,3-dimethoxy-3-methylbutane, substituting p-toluene sulfonic acid for the molecular sieve, and carrying out the reaction at 50°C instead of 250°C, there is obtained a 5 percent yield of isoprene.

In accordance with the foregoing procedure, but carrying out the reaction at 200°C instead of 250°C, there is obtained an 80 percent yield of isoprene.

EXAMPLE 14

In accordance with the general procedures of Example 12, 1,3-dimethoxy-3-methyl butane is heated for five hours at 160°C in N-methyl-2-pyrolidone solvent containing $ZnCl_2$. The weight ratio of solvent to starting material is 1:1, and the yield of isoprene is 80 percent.

EXAMPLE 15

Thirteen grams (0.1 mole) of 1,3-dimethoxy-2-methyl butane is passed through a reactor containing 6.0 grams of Amberlyst 15 resin at 300°C over a 4 hour interval. The yield of isoprene is 70 percent and the conversion is 83 percent. No catalyst deterioration is observed after 3 runs.

What is claimed is:

1. A process for the preparation of isoprene and methanol which comprises reacting isobutylene with methylal under anhydrous conditions in the presence of an acid catalyst, neutralizing the resulting reaction mixture, separating a resulting catalyst phase therefrom and thereafter subjecting the remaining neutralized reaction mixture to catalytic pyrolysis at temperatures of from about 175° to 350°C.

2. The process according to claim 1 wherein the acid catalyst is boron trifluoride, stannic chloride, aluminum bromide, titanium tetrachloride, sulfuric acid, boron trifluoride etherate, boron trifluoride in phosphoric acid, or boron trifluoride on alumina.

3. The process according to claim 1 wherein the pyrolysis is carried out in the presence of a catalyst selected from the group consisting of cation exchange resins, silica-alumina molecular sieves and organic acids.

4. The process according to claim 1 which comprises reacting isobutylene with methylal under anhydrous conditions in the presence of boron trifluoride to obtain a reaction mixture comprising 1,3-dimethoxy-3-methylbutane, 4-methoxy-2-methylbutene-1, methyl-t-butyl ether and isoprene, neutralizing said reaction mixture, separating a resulting catalyst phase therefrom, and then pyrolyzing the remaining neutralized mixture at temperatures of from about 175° to 350°C in the presence of a cation exchange resin or a silica-alumina molecular sieve catalyst to obtain a mixture comprising a major amount of isoprene and a minor amount of methanol.

5. A process for the production of isoprene which comprises the steps of:
   a. reacting t-butylhydroperoxide with methanol in the presence of an acid catalyst to form methylal and t-butyl alcohol, wherein the methanol is present in a two-to-twelve fold molar excess, based on the moles of hydroperoxide, and the acid catalyst is present in not more than a four weight percent concentration, based on the total weight of the acid alcohol mixture;
   b. dehydrating said t-butyl alcohol to form isobutylene;
   c. reacting said isobutylene with said methylal under anhydrous conditions in the presence of an acid catalyst, neutralizing the resulting reaction mixture, separating a resulting catalyst phase therefrom; and
   d. subjecting the remaining neutralized reaction mixture to catalytic pyrolysis at temperatures of from about 175° to 350°C.

6. The process according to claim 5 wherein the acid catalyst of step (a) is a mineral acid or an acid-treated silica-alumina molecular sieve.

7. The process according to claim 6 wherein the mineral acid is sulfuric acid.

8. The process according to claim 5 wherein in step (a) there is also employed a co-catalyst comprising salts of metals from groups IB, VI, VII or VIII of the Periodic table.

9. The process according to claim 8 wherein the metals are cobalt, iron, copper, nickel, manganese or chromium.

10. The process according to claim 8 wherein the metal salt is present in amounts of from about 0.1 to 5.0 grams per 50 to 70 grams of acid alcohol solution.

11. The process according to claim 5 wherein the acid catalyst of step (c) is boron trifluoride, stannic chloride, aluminum bromide, titanium tetrachloride sulfuric acid, boron trifluoride etherate, boron trifluoride in phosphoric acid, or boron trifluoride on alumina.

12. The process according to claim 5 wherein the catalyst of step (d) is a cation exchange resin, a silica-alumina molecular sieve or an organic acid.

* * * * *